US011210958B2

United States Patent
Ophir

(10) Patent No.: US 11,210,958 B2
(45) Date of Patent: Dec. 28, 2021

(54) METHOD AND SYSTEM FOR A DYNAMIC COLLISION AWARENESS ENVELOPE FOR A VEHICLE

(71) Applicant: Elbit Systems Ltd., Haifa (IL)

(72) Inventor: Yoav Ophir, Haifa (IL)

(73) Assignee: Elbit Systems Ltd., Haifa (IL)

( * ) Notice: Subject to any disclaimer, the term of this patent is extended or adjusted under 35 U.S.C. 154(b) by 0 days.

(21) Appl. No.: 17/263,500

(22) PCT Filed: Jul. 28, 2019

(86) PCT No.: PCT/IL2019/050854
§ 371 (c)(1),
(2) Date: Jan. 26, 2021

(87) PCT Pub. No.: WO2020/021557
PCT Pub. Date: Jan. 30, 2020

(65) Prior Publication Data
US 2021/0192963 A1 Jun. 24, 2021

(30) Foreign Application Priority Data
Jul. 26, 2018 (IL) .......................................... 260822

(51) Int. Cl.
*G08G 5/04* (2006.01)
*G01S 13/933* (2020.01)
(Continued)

(52) U.S. Cl.
CPC .............. *G08G 5/04* (2013.01); *G01S 13/933* (2020.01); *G01S 17/933* (2013.01); *G01S 19/39* (2013.01);
(Continued)

(58) Field of Classification Search
CPC ...... G08G 5/04; G08G 5/0078; G08G 5/0021; G06F 3/013; G01S 19/39; G01S 17/933; G01S 13/933
See application file for complete search history.

(56) References Cited

U.S. PATENT DOCUMENTS 6,405,132 B1 6/2002 Breed et al.
6,804,607 B1 10/2004 Wood
(Continued)

OTHER PUBLICATIONS

Nicolas Hautière et al, "Estimation of the Visibility Distance by Stereovision: a Generic Approach", MVA2005 IAPR Conference on Machine Vision Applications, May 16-18, 2005 Tsukuba Science City, Japan: 590-593 (2005).
(Continued)

*Primary Examiner* — Mathew Franklin Gordon
(74) *Attorney, Agent, or Firm* — Merchant & Gould P.C.

(57) ABSTRACT

A system determines a dynamic collision awareness envelope for a vehicle. The system includes at least one vehicle motion sensor, an operator Line-Of-Sight detector and a processor. The vehicle motion sensor periodically provides measurements relating to the motion of the vehicle in a reference coordinate system. The operator Line-Of-Sight detector periodically provides information relating to the direction of the Line-Of-Sight of an operator of the vehicle, in a vehicle coordinate system. The processor is coupled with the at least one vehicle motion sensor, and with the operator Line-Of-Sight detector. The processor determines an operator vector from the direction of the Line-Of-Sight of the operator. The processor further determines an operational vector at least from the motion of the vehicle. The processor periodically determines a collision awareness envelope respective of each of the operational vectors, from the operator vector and the respective operational vector.

23 Claims, 8 Drawing Sheets

(51) Int. Cl.
*G01S 17/933* (2020.01)
*G01S 19/39* (2010.01)
*G06F 3/01* (2006.01)
*G08G 5/00* (2006.01)

(52) U.S. Cl.
CPC ........... *G06F 3/013* (2013.01); *G08G 5/0021* (2013.01); *G08G 5/0078* (2013.01)

(56) References Cited

U.S. PATENT DOCUMENTS

| | | |
|---|---|---|
| 7,343,232 B2 | 3/2008 | Duggan et al. |
| 7,873,188 B2 | 1/2011 | Hautiere et al. |
| 8,487,787 B2 | 7/2013 | Best et al. |
| 2003/0227395 A1* | 12/2003 | Zeineh ................... G08G 1/207 340/988 |
| 2008/0306691 A1* | 12/2008 | Louis ................... G08G 5/0021 701/301 |
| 2009/0303078 A1* | 12/2009 | Mochizuki ............ B60W 40/02 340/901 |
| 2017/0247031 A1 | 8/2017 | Feit et al. |
| 2018/0090018 A1 | 3/2018 | Gavrilets et al. |

OTHER PUBLICATIONS

Thomas Sutter et al, "Camera Based Visibility Estimation": 1-9 (2016).
International Search Report and Written Opinion for PCT/IL2019/050854, dated Nov. 6, 2019.

* cited by examiner

METHOD AND SYSTEM FOR A DYNAMIC COLLISION AWARENESS ENVELOPE FOR A VEHICLE

This application is a National Stage application of PCT/IL2019/050854, filed Jul. 28, 2019, which claims priority to Israeli Patent Application No. 260822, filed Jul. 26, 2018, which applications are incorporated herein by reference. To the extent appropriate, a claim of priority is made to each of the above-disclosed applications.

FIELD OF THE DISCLOSED TECHNIQUE

The disclosed technique relates to determining collision awareness envelopes in general, and to methods and systems for determining dynamic collision awareness envelopes.

BACKGROUND OF THE DISCLOSED TECHNIQUE

Collisions between vehicles such as aircrafts, road vehicles (e.g., cars, trucks and the like), and marine vessels may cause damage to the vehicle, the cargo it carries, and may also cause injury or even death to the operators or the passengers of these vehicles. Such damage, injury or death results in substantial cost (e.g., damage repair, compensation, medical treatment and the like). Known in the art techniques for reducing the risk of collision between vehicles includes determining a collision awareness envelope of constant dimensions around the vehicle. When another vehicle is detected within this collision awareness envelope, an alarm is triggered alerting the operator of the vehicle that a danger of collision exists. For example, in an aircraft, a sphere of constant diameter is defined as around the aircraft. When another aircraft is detected to be within this sphere (e.g., by a Radar), than an alarm is triggered, alerting the pilot that a risk of collision exists.

U.S. Pat. No. 6,405,132 to Breed et al, entitled "Accident avoidance system" directs to a system and method for preventing vehicle accidents, in which a host vehicle on a roadway on a surface of the earth receives, on a first communication link from a network of satellites, GPS ranging signals relating to the position thereof. The host vehicle further receives on a second communication channel, Differential Global Positioning System (DGPS) auxiliary range correction signals for correcting propagation delay errors in the Global Positioning System (GPS). The position of the host vehicle on a roadway on a surface of the earth is determined from the GPS, DGPS, and accurate map database signals, and then communicated to other vehicles. The host vehicle receives position information from other vehicles and determines whether any other vehicle, from which position information is received, represents a collision threat to the host vehicle based on the position of the other vehicle relative to the roadway and the host vehicle. If the other vehicle represents a collision threat, a warning, or vehicle control signal response to control the host vehicle's motion is generated to prevent a collision with the other vehicle.

SUMMARY OF THE PRESENT DISCLOSED TECHNIQUE

It is an object of the disclosed technique to provide a novel method and system for determining dynamic collision awareness envelopes. In accordance with the disclosed technique, there is thus provided a system for determining a dynamic collision awareness envelope for a vehicle. The system includes at least one vehicle motion sensor, an operator Line Of Sight detector and a processor. The at least one vehicle motion sensor at least periodically provides measurements relating to the motion of the vehicle in a reference coordinate system. The operator Line Of Sight detector at least periodically provides information relating to the direction of the Line Of Sight of an operator of the vehicle, in a vehicle coordinate system. The processor is coupled with the at least one vehicle motion sensor, and with the operator Line Of Sight detector. The processor determines an operator vector at least from the direction of the Line Of Sight of the operator. The processor further determines at least one operational vector at least from the motion of the vehicle. The processor at least periodically determines a collision awareness envelope respective of each of the at least one operational vector, from the operator vector and the respective one of the at least one operational vector.

In accordance with another aspect of the disclosed technique, there is thus provided a method for determining a dynamic collision awareness envelope between a vehicle and each target of interest. The method includes the procedures of determining the Line Of Sight of a vehicle operator, determining the motion of the vehicle and determining an operator-vector at least from the LOS of the operator. The method further includes the procedures of determining at least one operational vector at least for the motion of the vehicle and for each of the at least one operational vector, at least periodically determining a respective collision awareness envelope from the operator vector and the respective operational vector.

BRIEF DESCRIPTION OF THE DRAWINGS

The disclosed technique will be understood and appreciated more fully from the following detailed description taken in conjunction with the drawings in which.

DETAILED DESCRIPTION OF THE EMBODIMENTS

Figure 1A:
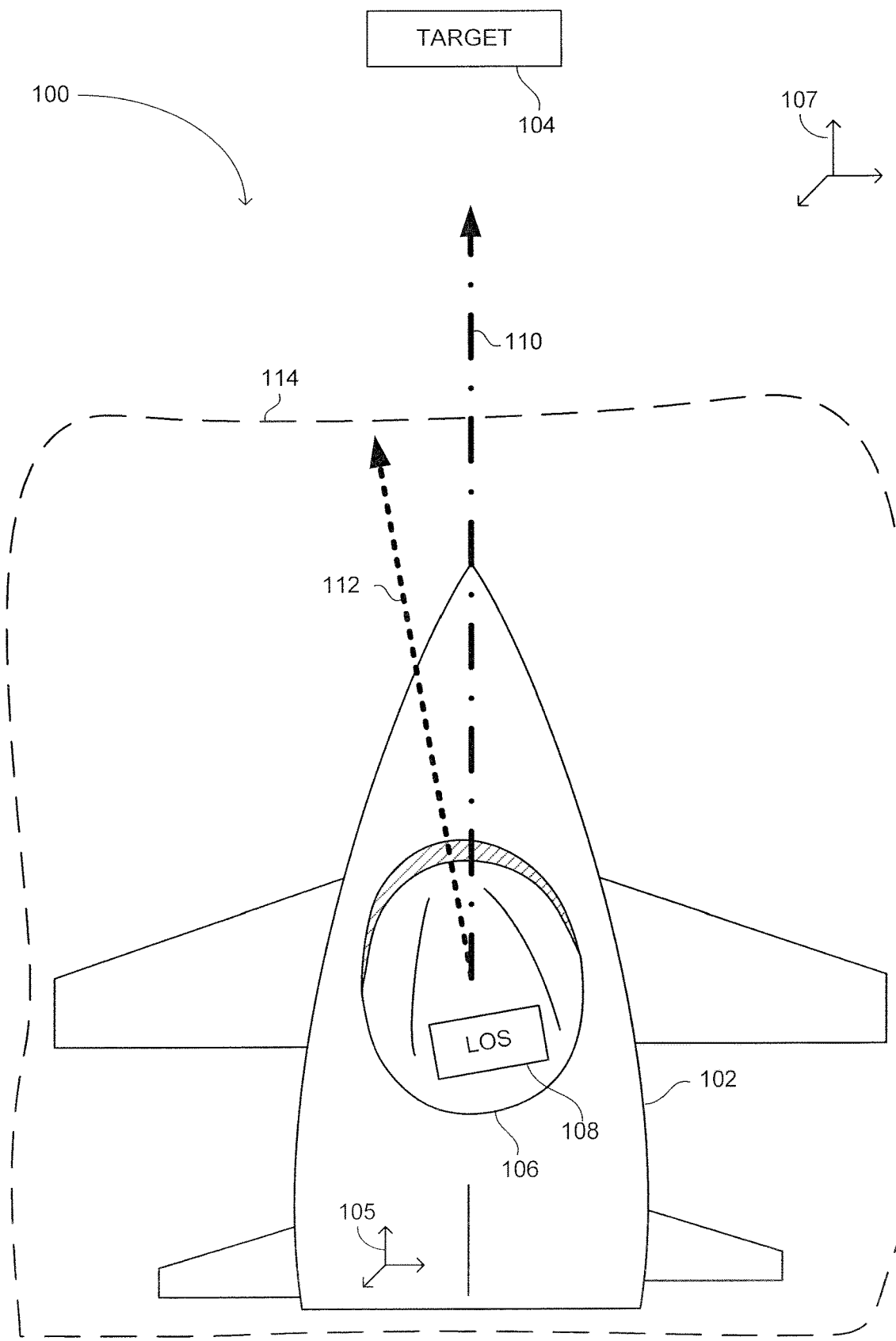
FIGS. 1A-1D are schematic illustrations of an exemplary scenario in accordance with an embodiment of the disclosed technique.

The disclosed technique overcomes the disadvantages of the prior art by providing a collision warning method and system for a vehicle, which determines a respective dynamic awareness envelope for each selected operational vector, according to the operational vector and an operator vector. The operational vector is, for example, the velocity vector of the vehicle, where direction of the vector is direction of motion of the vehicle in a reference coordinates system and the magnitude of the vector is the speed of the vehicle. The operational vector may alternatively or additionally be a vehicle-target vector respective of at least one target of interest. A vehicle-target vector is determined for each target of interest from the relative motion between the vehicle and the target, as further explained below. The direction of the operator vector is the LOS of the operator and the magnitude of the operator vector is either a constant or related to the visibility distance. The term 'dynamic' herein relates to the fact that the respective collision awareness envelope of each operational vector may change in time, as further explained below. When the target is located within the collision awareness envelope, an alarm may be initiated to the operator of the vehicle.

The operator vector is determined according to the LOS of the of the vehicle operator and optionally from visibility conditions, where the LOS is the direction of the operator vector (i.e., relative to the coordinate system of the vehicle), and the magnitude of the operator vector is either a constant or proportional to the visibility conditions. The operational vector is, for example, the velocity vector of the vehicle, where direction of the vector is direction of motion of the vehicle in the reference coordinates system and the magnitude of the vector is the speed of the vehicle. The operational vector is additionally or alternatively a vehicle-target vector. The vehicle-target vector is determined from the relative motion between the vehicle and the target of interest. Herein above and below the term 'motion' or 'trajectory' relates to locations, orientations, direction of motion and accelerations of a vehicle or a target. The term 'relative motion' relates herein to relative motion (i.e., relative locations, orientation and accelerations) between the vehicle and the target of interest. A relative location may be defined in terms of relative direction and distance between the vehicle and the target (i.e. relative spherical coordinates) or in relative Euclidean coordinates. The relative motion may be the previous relative motion, the current relative motion, the predicted relative motion or any combination thereof. Also, for the sake of the description herein, the vehicle and the targets are located and optionally move in a reference coordinate system (e.g., WSG84, ETRS89, Israel Transverse Mercator—ITM, or spherical coordinates of a radar station).

Reference is now made to FIGS. 1A-1D, which are schematic illustrations of an exemplary scenario, generally referenced 100, in accordance with an embodiment of the disclosed technique. Exemplary scenario 100 exemplifies determining a dynamic collision awareness envelope where the operational vector is a vehicle-target vector. In exemplary scenario 100, a vehicle 102 is exemplified as an aircraft flying toward a target 104. Aircraft 102 is operated by an operator (i.e., a pilot) 106. In exemplary scenario 100, it is assumed that target 104 is stationary in the reference coordinate system 107, and that aircraft 102 is flying at a constant velocity relative to target 104 (i.e., in the vehicle coordinate system 105) toward target 104. The vehicle-target vector is determined according to the relative motion between the aircraft 102 and target 104 (i.e., in the vehicle coordinate system 105). Specifically, in the exemplary scenario 100, the direction of vector 110 corresponds to the direction of the target relative to aircraft 102, and the magnitude of vehicle-target vector corresponds to the relative velocity between aircraft 102 and target 104. As mentioned above, in exemplary scenario 100, the velocity of aircraft 102 is constant relative to target 104 and aircraft 102 is flying toward target 104 (i.e., aircraft 102 does not change the direction of motion thereof). Thus, the vehicle-target vector is constant and is depicted in FIGS. 1A-1D as vehicle-target vector 110. Furthermore, FIGS. 1A-1D depict exemplary scenario 100 at four different states corresponding to four different time instances.

The operator vector is determined according to the LOS of pilot 106 and the visibility conditions. The LOS of pilot 106 is determined with an LOS detector 108. LOS detector 108 is for example, an electromagnetic, optical, inertial, or ultrasonic head position and orientation detector. LOS detector 108 may also be a hybrid of such head position and orientation detectors. LOS detector 108 may also be combined with an eye gaze detector. The LOS of pilot 106 indicates where pilot 106 is looking at in the vehicle coordinate system 105. The operator vector is determined according to the LOS of pilot 106 and the visibility conditions. The direction of the operator vector corresponds to the LOS of pilot 106 and the magnitude of the operator vector corresponds to the visibility conditions. The magnitude of the operator vector may also relate to LOS dynamics of pilot 106. The term 'LOS dynamics' relates not only to the LOS itself, but to the rate of change of the LOS of selected order or orders (e.g., angular velocity, angular acceleration or both). For the sake of the explanation which follows in conjunction with the example in FIGS. 1A-1D, the terms "poor" and "good" are employed to describe the visibility conditions. Nevertheless, determining the visibility conditions is further explained below. Also in conjunction with FIGS. 1A-1D, the terms "substantially toward" and "away from" are employed to describe the LOS of operator relative to the target (i.e., the angular difference between the operator LOS and the direction of the target in the vehicle coordinate system). However, in general, the LOS of the operator, as well as the direction of the target, are given as a direction (e.g., defined by at least two angles) in vehicle coordinate system 105.

With reference to FIG. 1A, the visibility conditions are "good" and the LOS of pilot 106 is "substantially toward" target 104. As such the operator vector is determined to be vector 112. A collision awareness envelope 114 is determined based on vehicle-target vector 110 and operator vector 112.

Figure 1B:
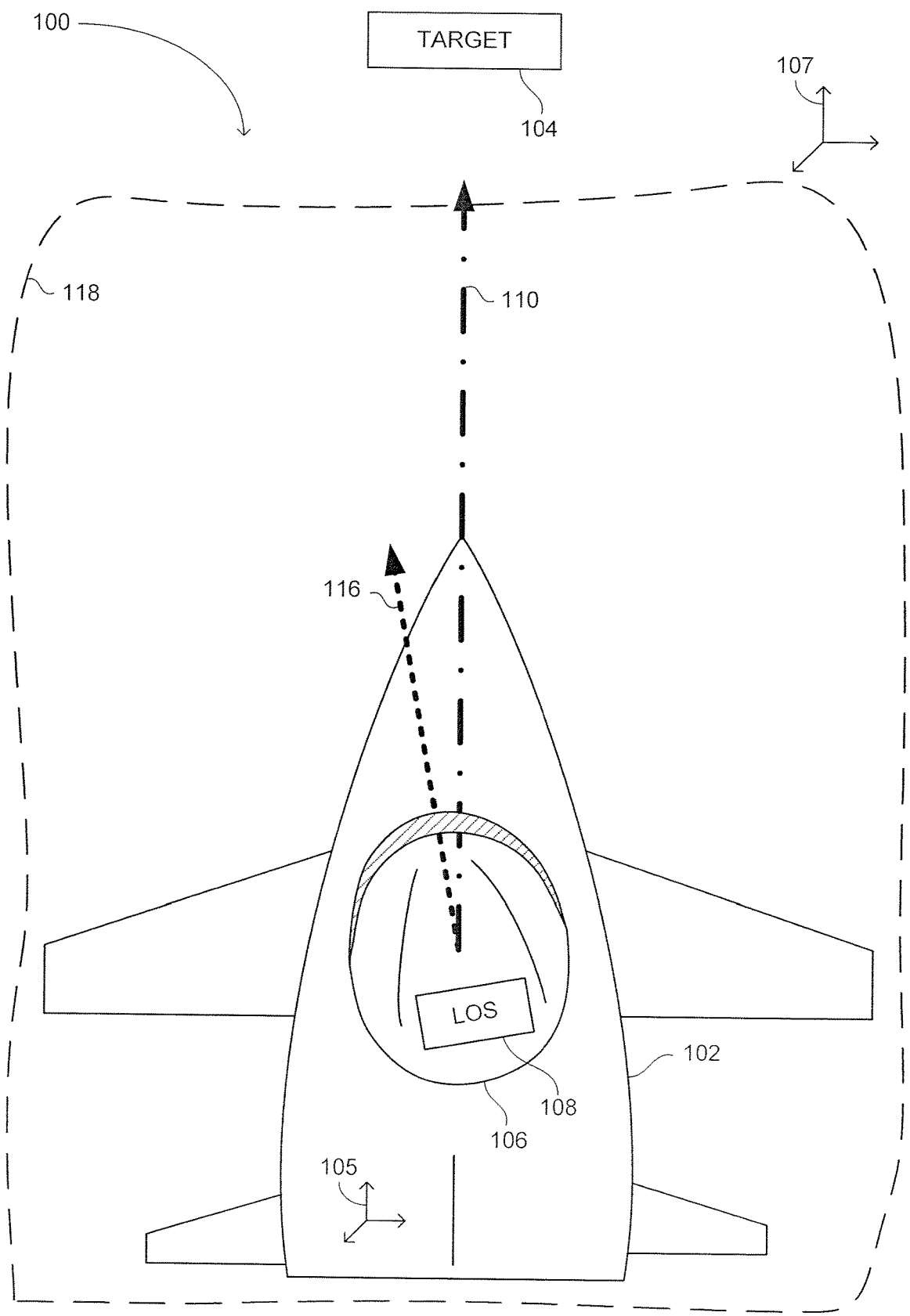

With reference to FIG. 1B, the visibility conditions are "poor" and the LOS of pilot 106 is "substantially toward" target 104. As such the operator vector is determined to be vector 116. The magnitude of vector 116 is larger than the magnitude of vector 112 (FIG. 1A) due to the "poor" visibility. A collision awareness envelope 118 is determined based on vehicle-target vector 110 and operator vector 116. As can be seen, collision awareness envelop 118 encompasses a larger area than collision awareness envelope 114 (FIG. 1A).

Figure 1C:
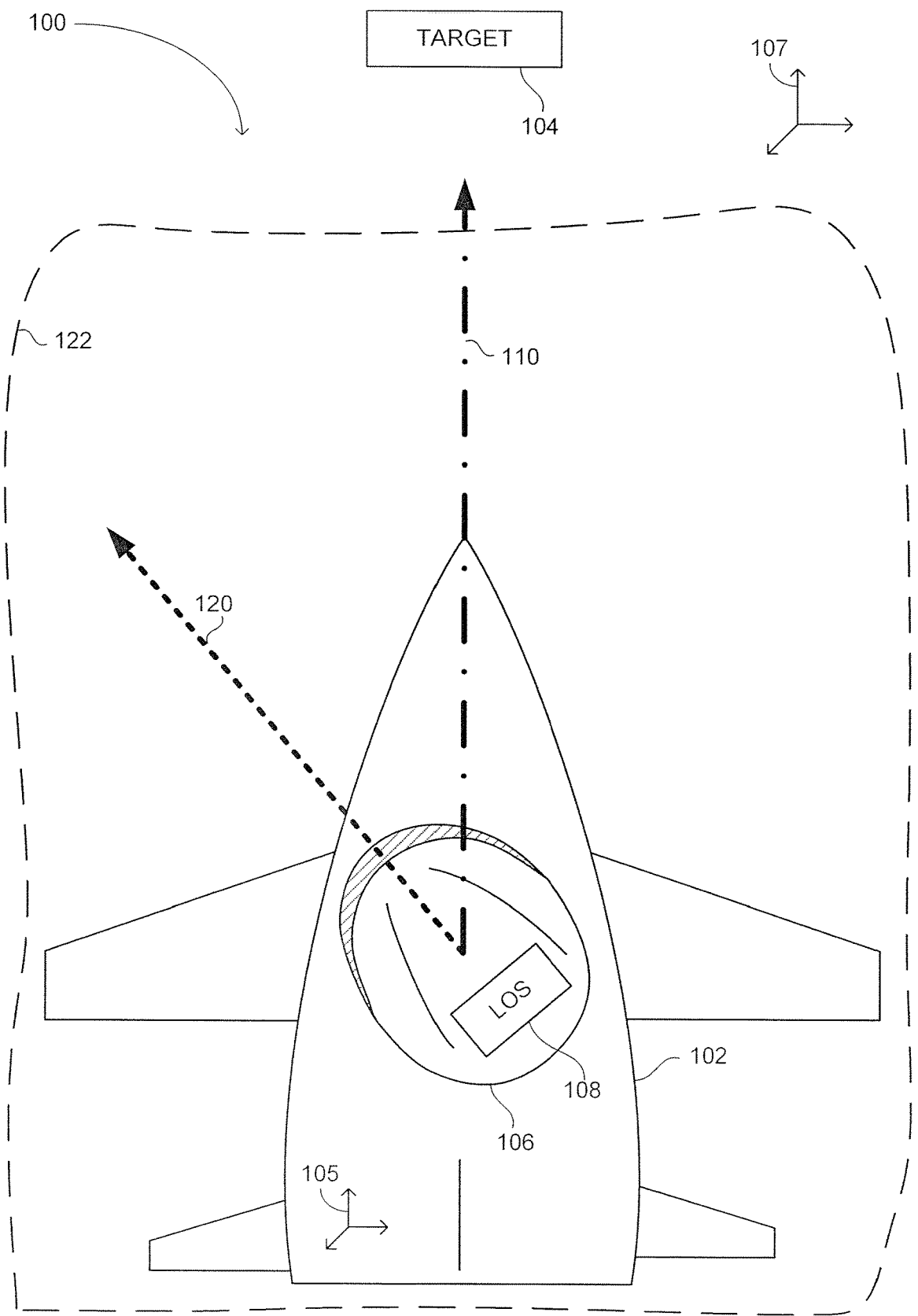

With reference to FIG. 1C, the visibility conditions are "good" and the LOS of pilot 106 is "away from" target 104. As such the operator vector is determined to be vector 120. The magnitude of vector 120 is larger than the magnitude of vector 112 (FIG. 1A) due to the fact that the LOS of pilot 106 is "away from" target 104 (i.e., a larger difference between the LOS of pilot 106 and the direction of target 104 in vehicle coordinate system 105). A collision awareness envelope 122 is determined based on vehicle-target vector 110 and operator vector 120. As can be seen, collision awareness envelop 122 encompasses similar area to collision awareness envelope 118 (FIG. 1C).

Figure 1D:
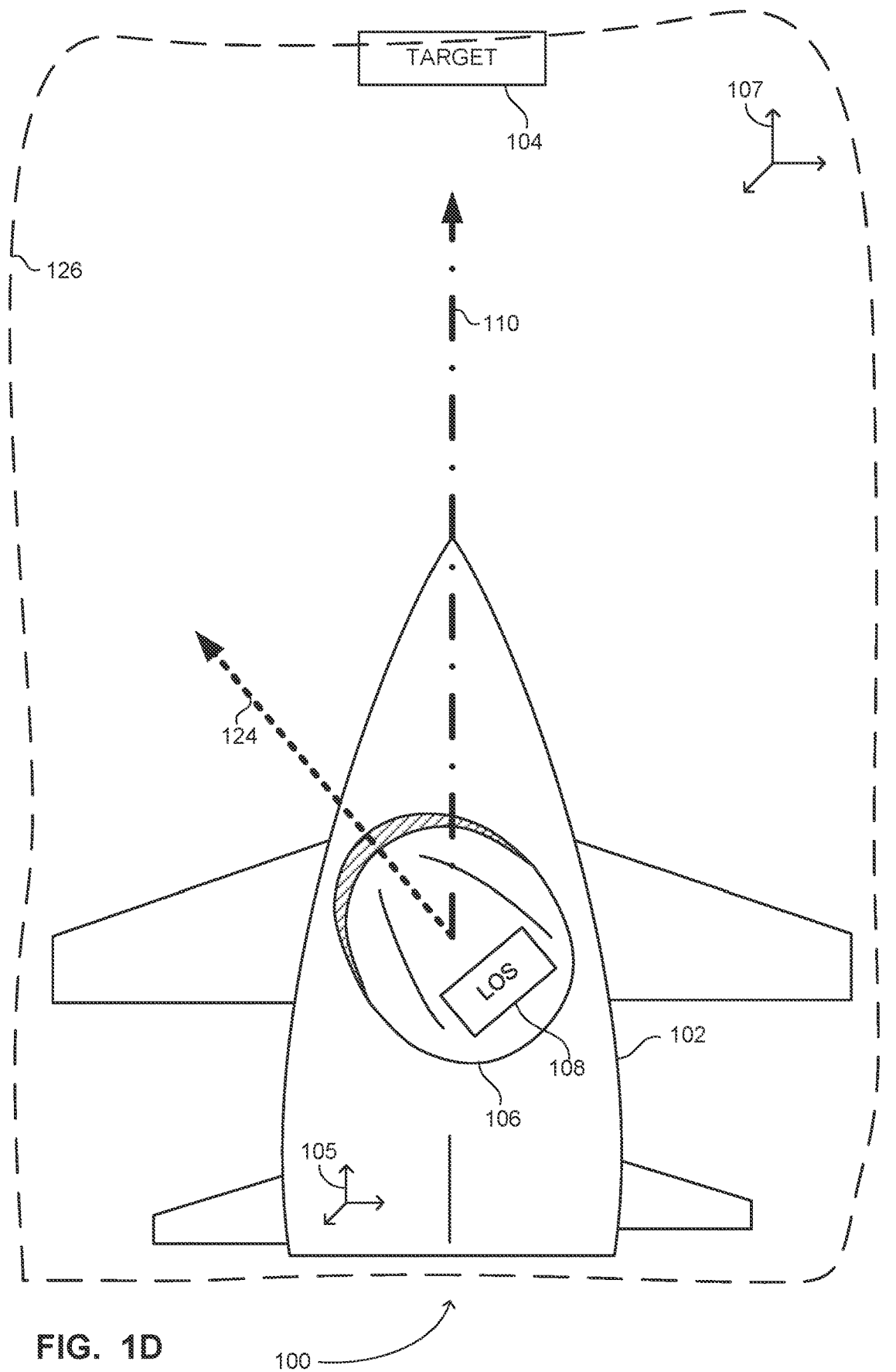

With reference to FIG. 1D, the visibility conditions are "poor" and the LOS of pilot 106 is "away from" target 104. As such the operator vector is determined to be vector 124. The magnitude of vector 124 is larger than the magnitude of vector 112 (FIG. 1A), vector 116 (FIG. 1B), and vector 120 (FIG. 1C) due to both the "poor" visibility, and the fact that the LOS of pilot 106 is "away from" target 104. A collision awareness envelope 126 is determined based on vehicle-target vector 110 and operator vector 124. As can be seen, collision awareness envelop 126 encompasses a larger area than collision awareness envelopes 118 and 122 (FIGS. 1C and 1D respectively). Also, in FIG. 1D, target 104 is located within collision awareness envelope 126. Consequently, an alarm may be initiated to pilot 106.

Figure 2A:
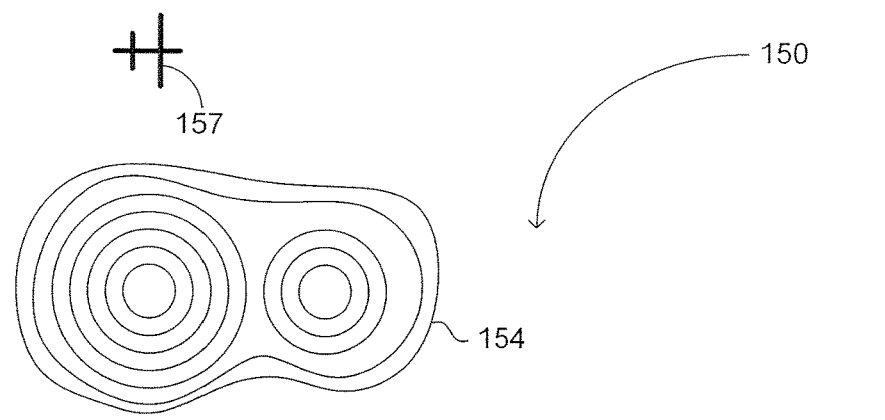
FIGS. 2A and 2B are schematic illustrations of an exemplary scenario in accordance with another embodiment of the disclosed technique.
Figure 2A:
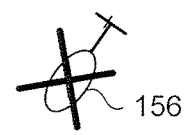
Figure 2A:
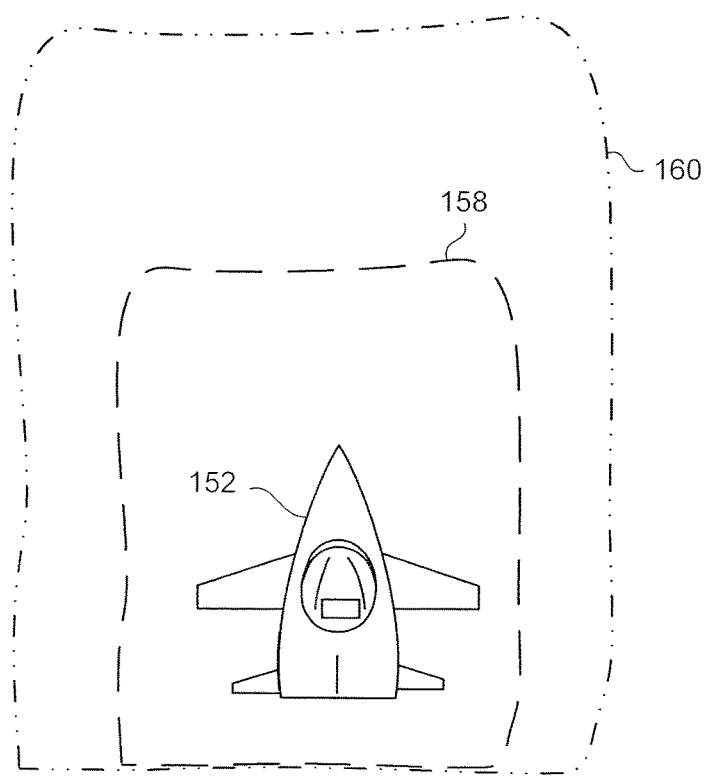
Figure 2B:
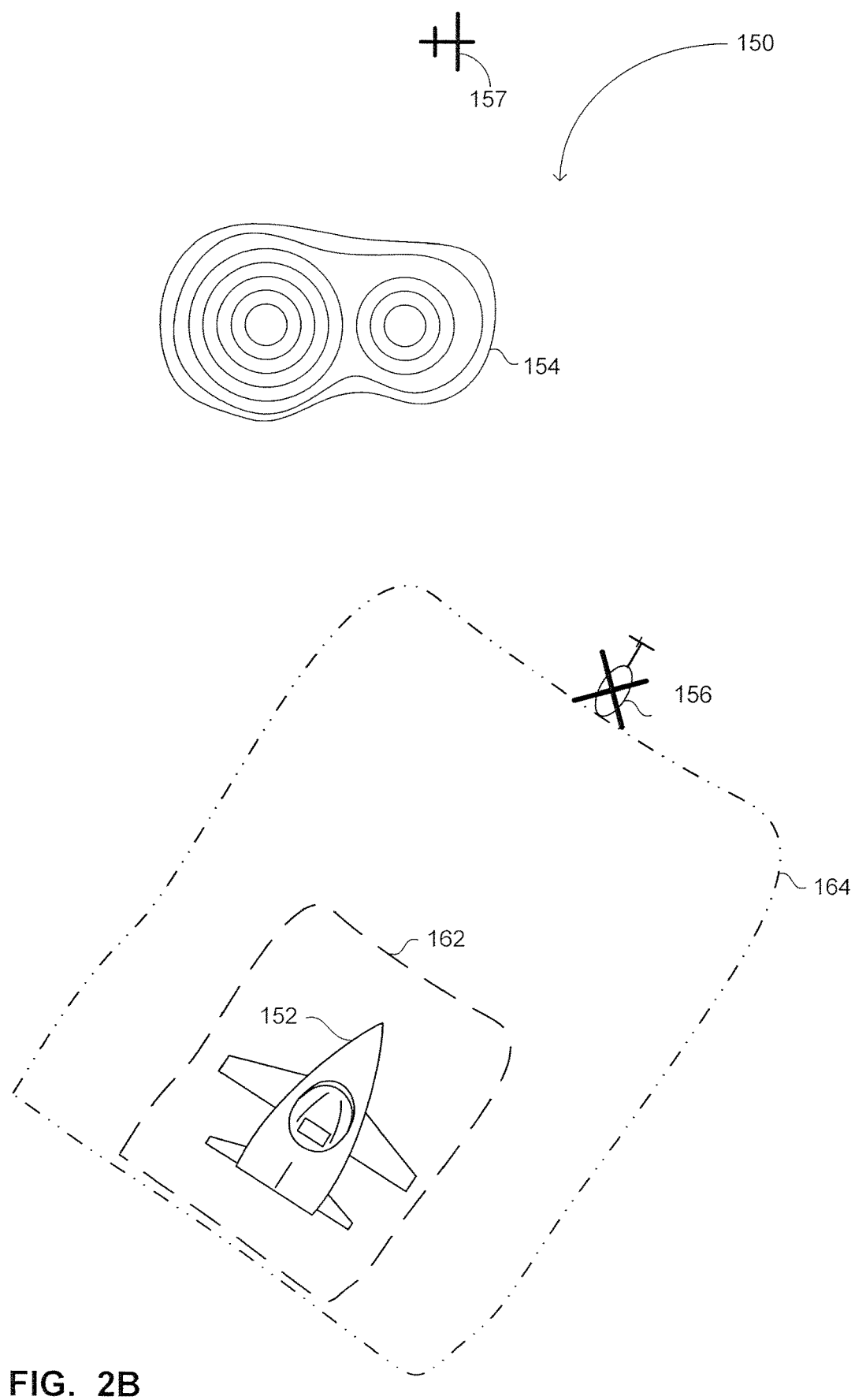

Reference is now made to FIGS. 2A and 2B, which are schematic illustrations of an exemplary scenario, generally referenced 150, in accordance with another embodiment of the disclosed technique. Exemplary scenario 150 also exemplifies determining dynamic collision awareness envelopes for two operational vectors, where the operational vectors are also vehicle-target vectors. In scenario 150, a vehicle 152 is exemplified as an aircraft. In scenario 150, the visibility conditions are assumed to be constant and the LOS of the operator of the vehicle is assumed coincide with the direction of motion of aircraft 152. Scenario 150 includes three exemplary targets, a mountain 154, a helicopter 156 and a second aircraft 157. However, only mountain 154 and helicopter 156 are selected to be target of interest (e.g., the distance between aircraft 152 and second aircraft 157 is larger than a predetermined distance-of-interest threshold distance). Also, FIG. 2A depicts scenario 150 at a time T1 and FIG. 2B depicts scenario 150 at a time T2 later than T1.

With reference to FIG. 2A, aircraft 152 is heading toward mountain 154. A respective collision awareness envelope 158 is determined for mountain 154. Furthermore, helicopter 156 is in a collision trajectory with aircraft 152, and is closer to aircraft 152 than mountain 154. Accordingly, a respective collision awareness envelope 160 is determined for helicopter 156. As can be seen, collision awareness envelope 160 encompasses a larger area than collision awareness envelop 158, for example, since the relative velocity between aircraft 152 and helicopter 156 is larger than the relative velocity between aircraft 152 and mountain 154, and because helicopter 156 is closer to aircraft 152 than mountain 154.

With reference to FIG. 2B, aircraft 152 changed the flight direction thereof, and is now heading toward helicopter 156. As such, a respective collision awareness envelope 162 is determined for mountain 154, and a respective a respective collision awareness envelope 164 is determined for helicopter 156. Collision awareness envelope 162 encompasses a smaller area than collision awareness envelope 158 (FIG. 2A) since aircraft 152 is not heading toward mountain 154. Furthermore, collision awareness envelope 164 encompasses a larger area than collision awareness envelope 160 (FIG. 2A), since aircraft 152 and helicopter 156 are still on a collision course therebetween and the relative velocity between aircraft 152 and helicopter 156 has increased.

Figure 3:
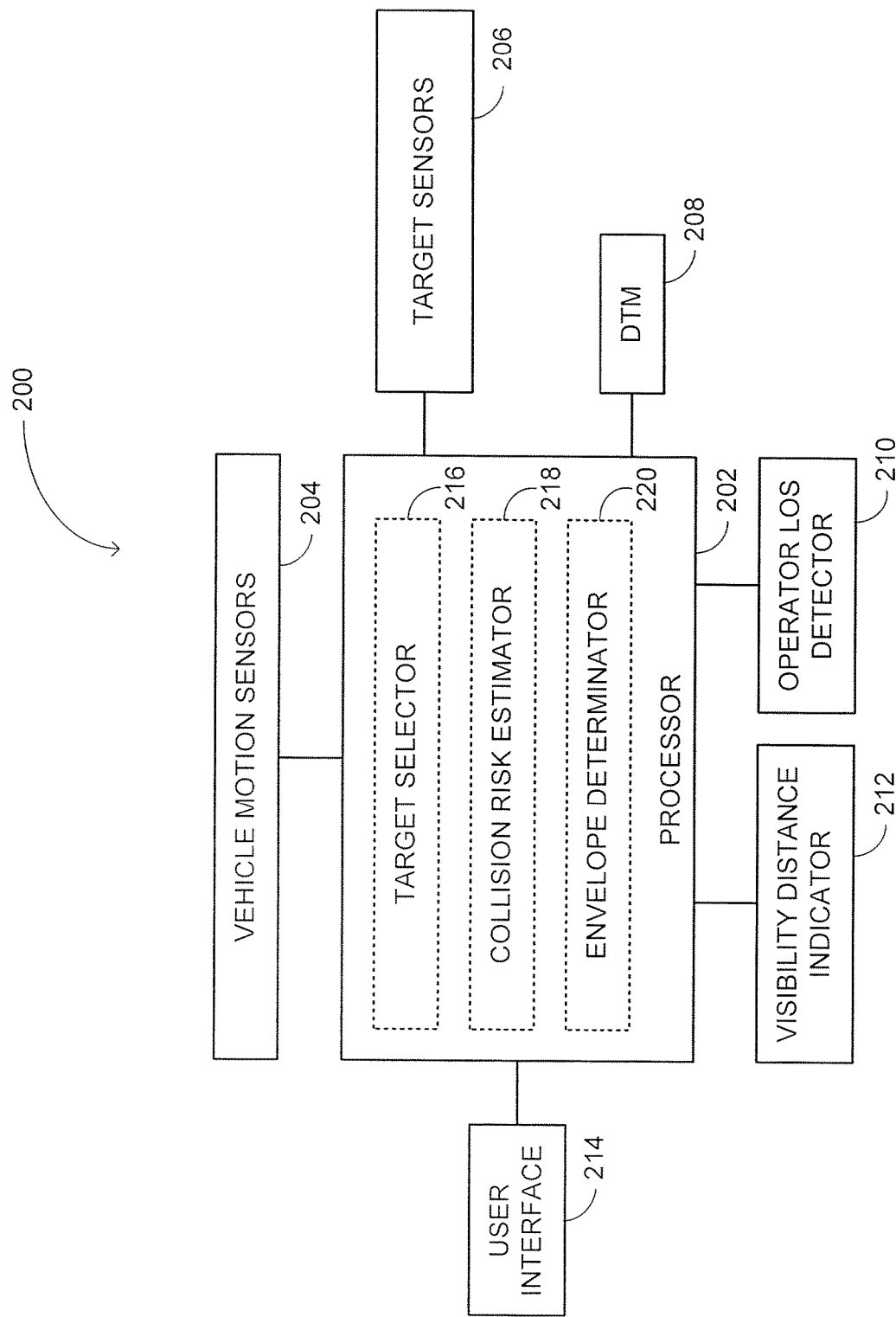
FIG. 3 is a schematic illustration of a system for determining a dynamic collision awareness envelope for a vehicle, in accordance with a further embodiment of the disclosed technique.

Reference is now made to FIG. 3, which is a schematic illustration of a system, generally referenced 200, for determining a dynamic collision awareness envelope between for a vehicle, constructed and operative in accordance with a further embodiment of the disclosed technique. System 200 includes a processor 202, vehicle motion sensors 204, target sensors 206, and a Digital Terrain Map (DTM) 208. System 200 further includes an operator LOS detector 210, a visibility indicator 212, and a user interface 214. Processor 202 is coupled with vehicle motion sensors 204, target sensors 206, and with DTM 208. Processor 202 is further coupled with operator LOS detector 210, visibility indicator 212, and with user interface 214. In general, system 200 determines, at least periodically, a respective collision awareness envelope for each of at least one operational vector. As mentioned above, the operational vector can be the velocity vector of the vehicle, or vehicle-target vectors respective of targets of interest, or both. The term 'at least periodically' relates herein to either periodically or continuously.

Target sensors 206 at least periodically detect targets in the vicinity of the vehicle. The term 'vicinity' specifically relates to the operational range of target sensors 206. Target sensors 206 include, for example, a RADAR, Light Detection and Ranging (LIDAR) detector, an optical detector (e.g., a visual camera, an infrared camera), or any combination thereof. Specifically, target sensors 206 provide information (also referred to herein as 'measurements') relating to the direction and distance of targets in the vehicle coordinate system. In general, a plurality of such measurements provide information relating to the relative motion (i.e., location of the targets relative to the vehicle in the vehicle coordinate system).

Vehicle motion sensors 204 included sensors, which at least periodically provide measurements relating to the location, orientation and accelerations of the vehicle in a reference coordinate system. Such sensors include, for example, Global Navigation System (GPS) or Inertial Navigation System (INS) or both. The inertial navigation system may include accelerometers and gyroscopes. Vehicle motion sensors 204 may also be a ground based radar system or optical tracking system providing (e.g., via a radio interface) the vehicle with information relating to the motion of the vehicle.

Operator LOS detector 210 at least periodically provide information relating to the direction of the LOS of the vehicle operator, in the vehicle coordinate system. Operator LOS detector 210 is, for example, an electromagnetic, optical, inertial or ultrasonic head location and orientation detector. LOS detector 210 may also be a hybrid of such head position and orientation detectors. LOS detector 210 may also be combined with an eye gaze detector. The head location and orientation detector detects the location and orientation of the head of the operator in the vehicle coordinate system. The eye tracker determines the gaze direction of the operator in a head coordinate system. The orientation of the head provides the LOS of the operator. When combined with an eye gaze detector, the orientation of the head, combined with the gaze direction of the operator provides the LOS of the operator. Although in the examples brought forth above in conjunction with FIGS. 1A-1D and FIGS. 2A-2B, the LOS detector is depicted as being located on the helmet of the pilot, that is not generally the case. The LOS detector 210 may include components located on the head of the operator as well as in other parts of the vehicle depending on technology employed. For example, an electromagnetic tracking system in an aircraft shall include transmitters in the cockpit and receivers on the helmet, or vice versa. Similarly, an optical tracking system may include a camera located in the cockpit and reflective balls located on the helmet, or vice versa. An inertial tracking system shall include inertial sensors located on the helmet only.

Visibility indicator 212 provides information relating to the visibility distance. In general, visibility distance may be defined as distance from a point, at which a selected object may become discerned from the background. Specifically, visibility distance can be defined as the distance at which the contrast of a given object with respect to its background is just equal to the contrast threshold of an observer. For example, 'visibility' may be defined according to the distance at which the contrast between an object and the background drops below two percent relative to a reference value (which is usually 1) between that object and the background. The reference contrast is, for example, the contrast between the object and the background when the distance between the object and the vehicle is substantially small. As the visibility in the vicinity of system 200 decreases, this contrast value also decreases. Alternatively, the World Meteorological Organization (WMO) defines a Meteorological Optical Range (MOR) as "the length of path in the atmosphere required to reduce the luminous flux in a collimated beam from an incandescent lamp, at a colour temperature of 2700 K, to 5 percent of its original value, the luminous flux being evaluated by means of the photometric luminosity function of the International Commission on Illumination. For aeronautical purposes, the surface MOR is measured at a height of 2.5 m above the surface." Visibility may also be related to the time of day. At night time the visibility distance is lower than at day time. Therefore, visibility indicator 212 may also include an ambient light sensor for sensing the ambient light in the vicinity of the aircraft. Alternatively or additionally, visibility indicator may be coupled with a clock indicating the local time of day.

Following are examples for determining the visibility distance. According to one alternative, visibility indicator 212 detects the visibility conditions by analyzing the image acquired by a camera around a region or regions of interest in the image, and determining a value corresponding to the contrast between objects and background in the image. Initially, an image of the at least part of the surroundings of the vehicle is acquired. Thereafter, the contrast associated with each pixel can be determined by determining the contrast in the corresponding pixel neighborhood (e.g., a 3×3 pixel patch). Also, each pixel is associated with a respective hypothetical distance. This hypothetical distance may be determined from DTM 208 and the known location and orientation of the camera. Since the location and orientation of the vehicle is known, the location and orientation camera is also known (i.e., in a reference coordinate system). Consequently, the point on DTM 208, corresponding to each pixel can also be determined. For example, each pixel is associated with a respective direction in the reference coordinate system. This direction can be represented by a line. The closest point to the camera, of the intersection of this line with DTM 208, is the point on DTM 208 corresponding to the pixel. The distance associated with that pixel is the distance between the vehicle and the corresponding point on DTM 208. The visibility range is determined when the contrast in the neighborhood of the pixel increases above a predetermined contrast value (e.g., five percent). According to another alternative, visibility distance may be provided by the operator or another human observer.

Processor 202 determines at least one operational vector. As mentioned above, the operational vector is the velocity vector of the vehicle. Additionally or alternatively, the operational vector may one or more vehicle-target vector. Processor 202 may at least periodically receive information relating to trajectory of the vehicle from vehicle motion sensors 204. Thus, processor 202 may at least periodically determine a velocity vector of the vehicle from the information relating to the trajectory of the vehicle. Also, processor 202 at least periodically receives information relating to targets from targets sensors 206. Targets sensor 206 at least provide information relating to the direction and distance of a target or targets from the vehicle in the vehicle coordinate system. Processor 202 determines the relative motion between the vehicle and the target or targets. Processor 202 may also at least periodically determine a vehicle-target vector respective a target from the relative motion between the vehicle and the target of interest. Processor 202 may also have information relating to the planned trajectory of the vehicle. Processor 202 may also have information relating to the planned trajectory of the target. Alternatively, 202 may estimate the predicted trajectory of the target based on pervious measurements from target sensors 206. Accordingly, processor 202 determines the predicted relative motion between the vehicle and the target.

Also, processor 202 at least periodically identifies terrain based targets. These terrain based targets are, for example, mountains, hills, ridges, antennas, buildings and the like. When the vehicle is and aircraft (e.g., an airplane, a helicopter, a drone and the like) a terrain based target may also be the ground beneath the vehicle. Processor 202 identifies terrain based targets from the measurements from vehicle motion sensors 204 and DTM 208. For example, terrain based targets that are within a predetermined distance and at a selected range of directions (i.e., in the vehicle coordinate system) from the current location of the vehicle are identified as terrain based targets.

Targets selector 216 selects targets of interest from the targets detected by target sensors 206. For example, target selector 216 selects only targets that are within a predetermined distance-of-interest from the vehicle as targets of interest. Alternatively or additionally, target selector 216 selects only selects targets that the return reflection thereof exhibits amplitude above a predetermined amplitude value as targets of interest. As a further example, target selector 216 selects targets that the distance thereof from the vehicle decreases as target of interest. In general, targets selector 216 selects targets of interest according to the relative motion therebetween. It is further noted that targets that exhibit similar relative motion characteristics (i.e., relative to the vehicle) and may be aggregated and considered as a single target. For example, a mountain may be identified as multiple targets. However, since all these targets exhibit similar relative motion, and each such target is located within a predetermined target-adjacency-distance from an adjacent target, all these targets may be aggregated and considered as a single target.

Thereafter, collision risk estimator 218 estimates the collision risk with each target of interest. In general, when the determined relative motion of the target, is predicted to pass through the origin of the vehicle coordinate system, then the target is on a collision course with the vehicle. For example, when vehicle moves at a constant velocity and in a constant direction, and a target exhibits a constant relative direction and a decreasing distance (i.e., over time), than that target is determined to be on a collision course with the vehicle. Alternatively or additionally, collision risk estimator 218 estimate the predicted smallest distance between the target and the vehicle and the predicted time that the target and the vehicle are the closest. Accordingly, for each target of interest, processor 202 determines a respective vehicle-target vector from the relative motion between (i.e., current, predicted, or both) the vehicle and each target of interest. The magnitude of the vehicle-target vector may be derived from the current distanced between the vehicle and the target or the predicted closest distance between the vehicle and the target. The direction of the vector is the direction of the target in the vehicle coordinate system. The magnitude of the operational vector may further be determined according to 'motion dynamics'. The term 'motion dynamics relates not only to the motion itself (i.e., the motion of the vehicle or the relative motion between the vehicle and a target), but also to the rate of change of this motion, of selected one or more orders (e.g., angular velocity, angular acceleration, linear accelerations or any combination thereof). For example, when there is a momentary risk of collision in the midst of a maneuver, according to the disclosed technique, the operational vector shall not be immediately affected. One example of accounting for motion dynamics is employing a smoothing filter (e.g., either by vehicle motion sensors 204 and target sensors 206, or processor 202) on the information provided by target sensors 206 or the vehicle motion sensors 204 or both.

As mentioned above, processor 202 receives information relating to the visibility distance from visibility distance indicator 212. Processor 202 at least periodically receives information relating to the LOS of the operator from operator LOS detector 210. Processor 202 determines an operator vector in the vehicle coordinate system for each period. The origin of the operator vector may be at the origin of the vehicle coordinate system or at the location of the operator in the vehicle coordinate system. The direction of the operator vector is the LOS of the operator and the magnitude of the operator vector is related to the visibility distance. The magnitude of the operator vector may optionally be related to the LOS dynamics.

Either one of Processor 202 or LOS detector 210 may further determine information relating to the LOS dynamics of the user. As mentioned above, LOS dynamics relates to the rate of change of the LOS of selected order or orders (e.g., angular velocity, angular acceleration or both). For example, processor 202 may determine that the LOS of the user exhibits an angular velocity that is above a predetermined angular velocity threshold. This means that the LOS of the operator is not fixed at a constant direction and thus, it is more likely that the operator will see a collision danger. As such, the instantaneous LOS may be of less significance. Accordingly, the rate of change of the LOS may be used to weight magnitude of the operator vector. For example, the higher the rate of change of the LOS of the operator, the less significant is the instantaneous LOS and the magnitude of the operator vector may be decreased. Alternatively or additionally, LOS detector 210 or processor 202 may include a smoothing filter.

Thereafter, envelope determinator 220 determines a respective collision awareness envelope for each of at least one operational vector. Envelope determinator 220 determines each envelope from the operator vector and the respective operational vector. For example, when the operational vector is a vehicle-target vector and the target of interest is moving toward the vehicle, the size of the envelope may be determined according to the following:

$$\text{envelope size} = \frac{\sin\left(\frac{\|\alpha_1 - \alpha_2\|}{2}\right) V_{REL}}{Vis \, d_C d_P} + C \quad (1)$$

where $\alpha_1$ is the LOS of the operator $\alpha_2$ is the direction of the target relative to the direction of motion of the vehicle, $V_{REL}$ is the relative speed between the target and the vehicle, Vis is the visibility distance, $d_C$ is the current distance between the target and the vehicle, $d_p$ is the predicted distance between the target and the vehicle, and C is a constant. Also, when the LOS dynamics are to be accounted for, the rational in equation (1) may be multiplied by the inverse of the derivative (i.e., of a selected degree) of the LOS. When motion dynamics are to be accounted for, the respective derivatives may be incorporated as well. If information relating to the predicted distance ($d_p$) is not available, the $d_p$ can be set equal to one. It is also noted that $V_{REL}$, Vis, $d_C$, and $d_p$ are normalized values and the size of the envelope provide by equation (1) is normalized as well. Similarly, when the operational vector is the vehicle velocity vector, the size of the envelope may be determined according to the following:

$$\text{envelope size} = \sin\left(\frac{\|\alpha_1 - \alpha_3\|}{2}\right) V_V + C \quad (2)$$

where $\alpha_1$ is the LOS of the operator $\alpha_3$ is the direction of motion of the vehicle, $V_v$ is the speed of the vehicle and C is a constant. The visibility and LOS dynamics may be incorporated into equation (2) similar to as described above.

In general, the envelope may take a predetermined geometrical shape (e.g., a sphere, an ellipsoid, a cube, or a cone) or an arbitrary shape (e.g., corresponding to the outlines of the vehicle). The size of the envelope relates to parameters of the selected shape. For example, the radius of a sphere, the size of the principal semi-axes of an ellipsoid, the length of the side of a cube, the radius of the base of a cone and the height thereof. When the shape is arbitrary, the size of the arbitrary shape may be related to the size of a geometric shape enclosing the arbitrary shape (e.g., the size of the cube enclosing the outlines of the vehicle)

Also, a plurality of shapes may be presented to the user to choose from or selected, for example, according terrain, altitude and the like. For example, when the vehicle is an aircraft flying at low altitude in a mountain terrain, an ellipsoid may be chosen, while flying at high altitude a sphere may be chosen. Furthermore, the actual size of each envelope corresponding to a target of interest may also be determined according to various parameters, for example, the actual size of the vehicle and/or the maneuverability of the vehicle. When the vehicle is an aircraft, the actual size of the envelope may further be determined according to the type of mission (e.g., civilian, military) being flown and mission parameters. For example, the size of the envelope may be smaller when flying in formation than when an aircraft is flying by itself, for the same operator vector and the respective vehicle-target vector. The size of the envelope may further be determined according to information relating to the target (e.g., maneuverability), when such information is available. When processor 202 determines that a target of interest is within the respective collision awareness envelope, processor 202 may produce an alarm via user interface 214.

Figure 4:
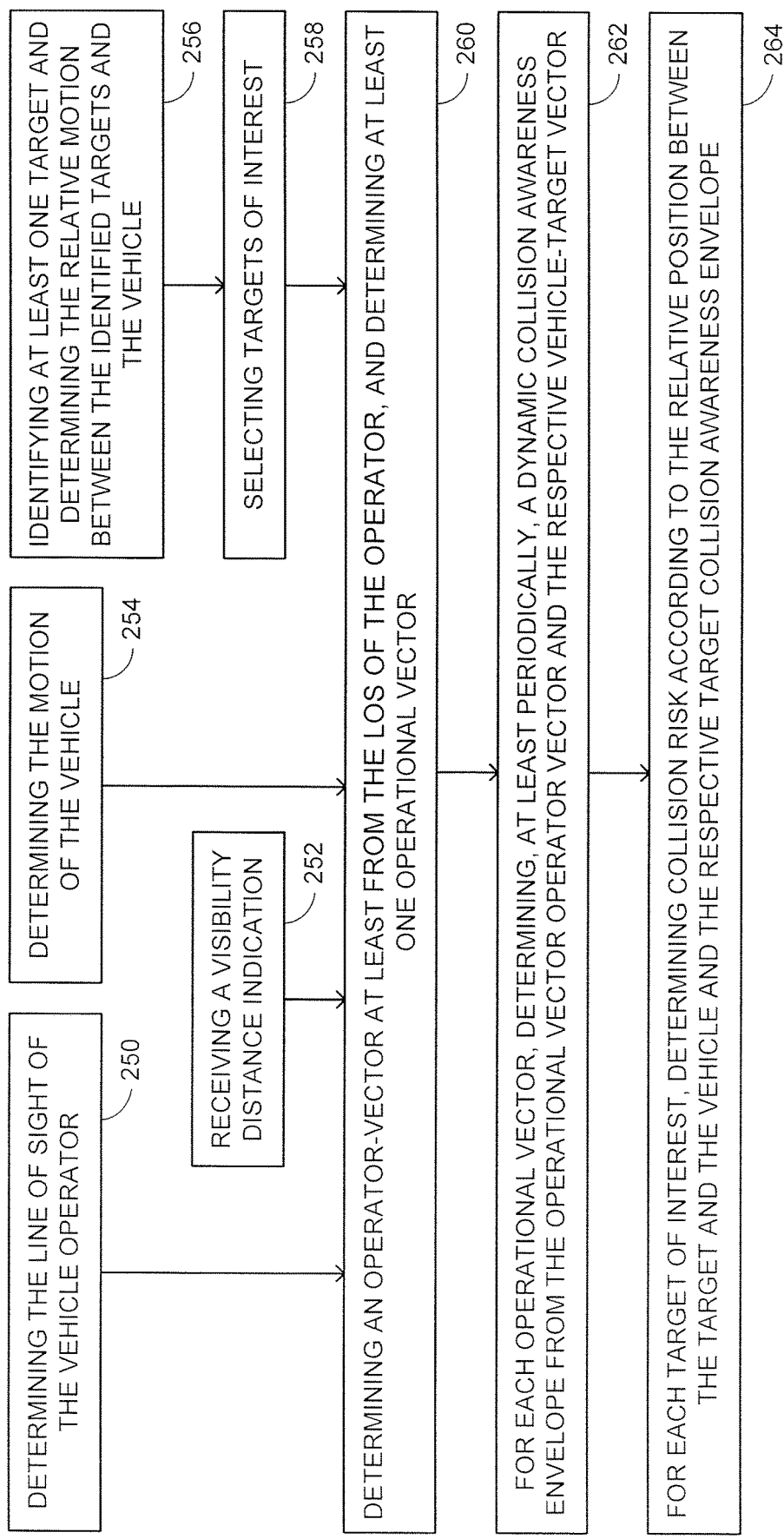
FIG. 4 is a schematic illustration of a method for determining a dynamic collision awareness envelope for a vehicle, constructed and operative in accordance with another embodiment of the disclosed technique.

Reference is now made to FIG. 4, which is a schematic illustration of a method for determining a dynamic collision awareness envelope for a vehicle, operative in accordance with another embodiment of the disclosed technique. In procedure 250, the line of sight of the vehicle operator is determined. The LOS of the operator is determined by determining the location and orientation of the head of the operator in the vehicle coordinate system. Optionally, the gaze direction of the operator in a head coordinate system is also determined. When the eye gaze is detected as well, the orientation of the head, combined with the gaze direction of the operator provides the LOS of the operator. Furthermore, the operator LOS dynamics may also be determined as explained above. With reference to FIG. 3, Operator LOS detector 210 at least periodically provides information relating to the direction of the LOS of the vehicle operator.

In procedure 252, a visibility distance indication is received. As mentioned above, visibility distance can be defined as the distance at which the contrast of a given object with respect to its background is just equal to the contrast threshold of an observer. The visibility distance may be determined from an image of the surrounding of the vehicle or by a human observer. With reference to FIG. 3, visibility distance indicator 212 provides information relating to the visibility distance.

In procedure 254, the motion of the vehicle is determined. As mentioned above, motion relate to the location, orientation and accelerations of the vehicle in a reference coordinate system. With reference to FIG. 3, vehicle motion sensors 204 provide information relating to the motion of the vehicle.

In procedure 256, at least one target is identified and the relative motion between the identified target and the vehicle is determined. As mentioned above, this relative motion may be current relative motion, previous relative motion or predicted relative motion. With reference to FIG. 3, target sensors 206 determine information relating to the relative motion between the at least one identified target and the vehicle.

In procedure 258, targets of interest are selected. For example, only targets that are within a predetermined distance-of-interest from the vehicle are targets of interest. Alternatively or additionally, only targets that the return reflection (e.g., light reflection, electromagnetic reflection) thereof exhibits amplitude above a predetermined amplitude value are targets of interest. As a further example, targets that the distance thereof from the vehicle decreases are selected as target of interest. With reference to FIG. 3, target selector 216 selects target of interest.

In procedure 260, an operator vector is determined from the LOS of the operator and the target direction, and the visibility. At least one operational vector is also determined. The direction of the operator vector is the LOS of the operator and the magnitude of the operator vector is either a constant or related to the visibility distance. The operational vector is, for example, the velocity vector of the vehicle, where direction of the vector is direction of motion of the vehicle in the reference coordinates system and the magnitude of the vector is the speed of the vehicle. The operational vector may alternatively or additionally be a vehicle-target vector respective of each target of interest. A vehicle-target vector is determined for each target of interest from the relative motion between the vehicle and the target. The magnitude of the vehicle-target vector may be derived from the current distanced between the vehicle and the target or the predicted closest distance between the vehicle and the target. The direction of the vehicle-target vector is the direction of the target in the vehicle coordinate system. With reference to FIG. 3, processor 202 determines an operator vector and a vehicle-target vector.

In procedure 262, for each operational vector, a dynamic collision awareness envelope is determined, at least periodically, from the operator vector and operational vector. As described above, the size of the envelope may be determined according to Equation (1) or Equation (2). The shape of the envelope may be a predetermined geometrical shape (e.g., a sphere, an ellipsoid, a cube, a cone), or an arbitrary shape (e.g., corresponding to the outlines of the vehicle). With reference to FIG. 3, processor 202 determines a collision awareness envelope for each target of interest.

In procedure 264, for each target of interest, a collision risk is determined according to the relative position between the target and the vehicle and the respective collision awareness envelope. With reference to FIG. 3, collision risk estimator 218 determines the collision risk for each target of interest.

It will be appreciated by persons skilled in the art that the disclosed technique is not limited to what has been particularly shown and described hereinabove. Rather the scope of the disclosed technique is defined only by the claims, which follow.

The invention claimed is:

1. A system for determining a dynamic collision awareness envelope for a vehicle, the system comprising:
at least one vehicle motion sensor configured to, at least periodically, provide measurements relating to the motion of said vehicle relative to a reference coordinate system;
a Line Of Sight (LOS) detector configured to, at least periodically, provide information relating to the direction of a Line Of Sight of an operator of said vehicle, relative to a vehicle coordinate system; and
a processor, coupled with said at least one vehicle motion sensor, and with said LOS detector;
wherein one of said LOS detector and said processor is configured to determine information relating to LOS dynamics of said operator; and
wherein said processor said processor is configured to:
determine an operator vector at least from said information relating to said direction of said Line Of Sight of said operator, wherein a magnitude of said operator vector is weighted according to said LOS dynamics;
determine at least one operational vector at least from said motion of said vehicle; and
for each one of said at least one operation vector, determine a collision awareness envelope respective of each of said at least one operational vector, from said operator vector, said one of said at least one operational vector, and a relationship there between.

2. The system according to claim 1, wherein said operational vector corresponds to the velocity of said vehicle.

3. The system according to claim 1, wherein said system further comprises at least one target sensor configured to at least periodically detect targets in a vicinity of said vehicle, wherein said processor is further configured to:
select said at least one target of interest from said detected targets in said vicinity of said vehicle,
determine relative motion between said vehicle and each of said at least one target of interest,
wherein for each one of said at least one target of interest, said processor is configured to determine said operational vector from said relative motion between said vehicle and said one of said at least one target of interest.

4. The system according to claim 3, wherein for each target of interest, the magnitude of said operational vector is derived from the current distance between said vehicle and said one of said at least one target of interest, and the direction of said operational vector is the direction of said target of interest relative to said vehicle coordinate system.

5. The system according to claim 3, wherein for each one of said at least one target of interest, the magnitude of said operational vector is the predicted closest distance between said vehicle and said at least one target of interest, and the direction of said operational vector is the direction of said at least one target of interest relative to said vehicle coordinate system.

6. The system according to claim 3, wherein said at least one target sensor is selected from the group consisting of:
a RADAR;
a Light Detection and Ranging detector; and
an optical detector.

7. The system according to claim 1, further including a visibility indicator configured to, at least periodically, provide information relating to a visibility distance,
   wherein said processor is further configured to determine said operator vector according to said information relating to said visibility distance.

8. The system according to claim 7, wherein the direction of said operator vector is the line of sight of said operator and the magnitude of said operator vector is related to the visibility distance.

9. The system according to claim 1, further including a digital terrain map, wherein said processor is further configured to identify terrain based targets from said measurements provided from said at least one vehicle motion sensor and said digital terrain map.

10. The system according to claim 1, wherein said at least one vehicle motion sensor is selected from the group consisting of:
   Global Navigation System;
   Inertial Navigation System;
   a ground based radar system; and
   a ground based optical tracking system.

11. The system according to claim 1, wherein the shape of said collision awareness envelope is a predetermined geometric shape.

12. The system according to claim 1, wherein the shape of said collision awareness envelope corresponds to the outlines of the vehicle.

13. The system according to claim 3, wherein for each one of said at least one target of interest, said processor is further configured to determine a collision risk according to a relative position between said one of said at least one target of interest and said vehicle and said collision awareness envelope.

14. A method for determining a dynamic collision awareness envelope between a vehicle and each target of interest, the method comprising the procedures of at least periodically:
   determining information relating to a Line Of Sight (LOS) of an operator of said vehicle relative to a vehicle coordinate system, said information comprising LOS dynamics;
   determining information relating to motion of said vehicle relative to a reference coordinate system;
   determining an operator vector at least from said LOS of said operator, wherein a magnitude of said operator vector is weighted according to said LOS dynamics;
   determining at least one operational vector at least from said information relating to said motion of said vehicle; and
   for each of said at least one operational vector, at least periodically determining a collision awareness envelope from said operator vector, said one of said at least one operational vector, and a relationship there between.

15. The method according to claim 14, wherein said operational vector corresponds to the velocity of said vehicle.

16. The method according to claim 14, further including the procedures of:
   identifying at least one target;
   determining relative motion between said at least one identified target and said vehicle;
      selecting at least one target of interest from said at least one identified target; and
      wherein for each one of said at least one target of interest, determining said at least one operational vector comprises determining from the relative motion between said vehicle and said one of said at least one target of interest.

17. The method according to claim 16, wherein for each one of said at least one target of interest, a magnitude of said operational vector is derived from the current distance between said vehicle and said one of said at least one target of interest and a direction of said operational vector is a direction of said one of said at least one target of interest relative to said vehicle coordinate system.

18. The method according to claim 16, wherein for each one of said at least one target of interest, the magnitude of said operational vector is a predicted closest distance between said vehicle and said one of said at least one target of interest and a direction of said operational vector is a direction of said one of said at least one target of interest relative to said vehicle coordinate system.

19. The method according to claim 14, further including the procedure of receiving a visibility distance indication,
   wherein said operator vector is further determined according to said visibility distance indication.

20. The method according to claim 19, wherein the direction of said operator vector is said Line Of Sight of said operator and the magnitude of said operator vector is related to said visibility distance.

21. The method according to claim 16, further including the procedure of determining for each one of said at least one target of interest, a collision risk according to a relative position between said one of said at least one target of interest and said vehicle, and said collision awareness envelope.

22. The method according to claim 14, wherein the shape of said collision awareness envelope is a predetermined geometric shape.

23. The method according to claim 14, wherein the shape of said collision awareness envelope corresponds to the outlines of the vehicle.

* * * * *